Patented June 14, 1949

2,472,965

UNITED STATES PATENT OFFICE 2,472,965

METALLIZED TETRAKISAZO DYES

Walter Wehrli, Basel, Switzerland, assignor to Sandoz Limited, Basel, Switzerland, a Swiss firm No Drawing. Application June 12, 1947, Serial No. 754,273. In Switzerland July 14, 1941

8 Claims. (Cl. 260—145)

The present application is in part a continuation of my co-pending patent application Ser. No. 449,952, filed on July 6, 1942, now Patent Number 2,427,539.

The present invention relates to new substantive metallized azo dyestuffs and to a process for their manufacture.

It has been found that new valuable metallized substantive azo dyestuffs can be prepared by diazotizing a disazo dyestuff of the general formula

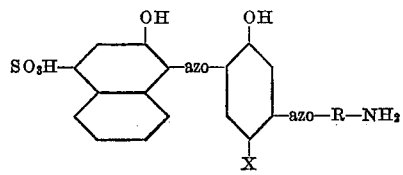

wherein X is hydrogen or alkyl and R means the radical of Cleve's acid, coupling the resultant diazodisazo dyestuff with an azo component of the general formula

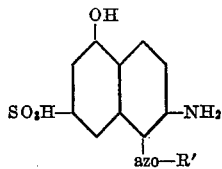

wherein R' is a substituted or unsubstituted phenyl radical, and reacting the polyazo dyestuff thus obtained with a metal yielding agent.

The complex metal compounds of the polyazo dyestuffs prepared as herein before defined may further contain groups which are capable of linking metals; in this case, they can be treated with metallizing compounds either in substance or when already dyed on the fibre.

If, instead of the disazo dyestuffs, their metallized derivatives are used as starting materials, the treatment with the metallizing agents can be carried out already with the monoazo dyestuffs used for their preparation or with the ready prepared disazo dyestuffs. Under the expression "metallizing agents" I understand substances which, when applied by usual methods on azo dyestuffs containing groups capable of linking metals, transform the dyestuffs into their metal complex compounds. Such metallizing agents are for example compounds of copper, nickel, cobalt, chromium, iron, vanadium, and the like. Likewise the metals can be used as such or mixtures of such metal compounds can be used.

The coupling operation is preferably carried out in the presence of an acid binding agent, such as sodium carbonate, sodium acetate, chalk, calcium hydroxide, pyridine, pyridine bases and the like.

The new dyestuffs obtainable according to my present invention dye cotton, linen and artificial fibres from regenerated cellulose in fast blue-gray shades possessing an excellent affinity. According to the present method dyeings will be produced which possess good wet-fastness properties an excellent light-fastness properties.

The following examples, without being limitative, illustrate the present invention, the parts being by weight.

*Example 1*

63.7 parts of the disazo dyestuff of the formula

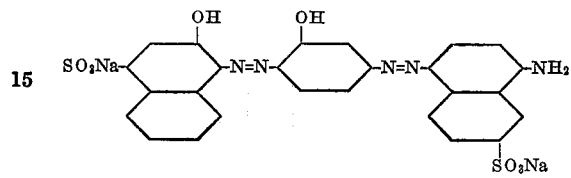

are diazotized with 6.9 parts of sodium nitrite and 25 parts of hydrochloric acid and coupled in the presence of 50 parts of sodium bicarbonate and 50 parts of technical pyridine base mixture with 36.5 parts of a monoazo dyestuff of the formula

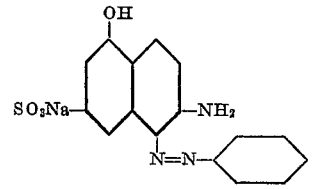

The dyestuff thus obtained is then salted out and filtered. The precipitate is dissolved in water and transformed into its copper derivative by treating it at an elevated temperature with 25 parts of copper sulfate in the presence of sodium acetate. After salting out, filtration and drying the new dyestuff is a bronzing powder. It dyes cotton and artificial silk from regenerated cellulose in bluish grey shades, which are very fast to light.

The transformation of the polyazo dyestuff into its copper-complex compound can, with the same success, be carried out by treating it with copper sulfate in the presence of ammonia.

*Example 2*

69.9 parts of the copper compound of the disazo dyestuff of the formula

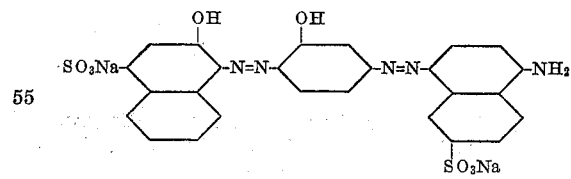

are diazotized with 6.9 parts of sodium nitrite and 25 parts of hydrochloric acid and coupled with 44.7 parts of the monoazo dyestuff of the formula

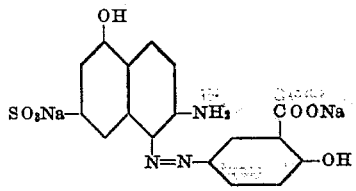

in presence of sodium bicarbonate and technical pyridine bases. The dyestuff then is isolated in the usual way, whereupon it dyes cotton in greenish grey-blue shades, the fastness properties of which can be improved by a subsequent treatment with metal salts and more particularly with copper or chromium salts.

What I claim is:

1. A process for the manufacture of a complex metal compound of a substantive polyazo dyestuff, comprising the steps of diazotizing a disazo dyestuff of the formula

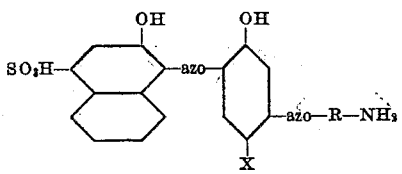

wherein X is a member selected from the group consisting of hydrogen and alkyl and R means the radical of Cleve's acid, coupling the resultant diazodisazo dyestuff with an azo component of the general formula

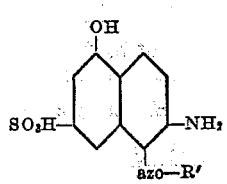

wherein R' is a member selected from the group consisting of unsubstituted and substituted phenyl radicals, and interacting the polyazo dyestuff thus obtained with a metal yielding agent.

2. A process for the manufacture of a complex copper compound of a substantive polyazo dyestuff, comprising the steps of diazotizing a disazo dyestuff of the formula

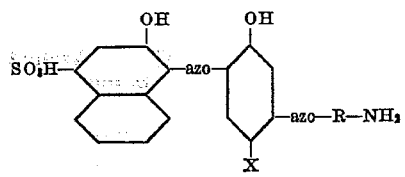

wherein X is a member selected from the group consisting of hydrogen and alkyl and R means the radical of Cleve's acid, coupling the resultant diazodisazo dyestuff with an azo component of the general formula

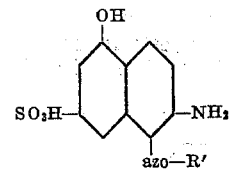

wherein R' is a member selected from the group consisting of unsubstituted and substituted phenyl radicals, and interacting the polyazo dyestuff thus obtained with a copper yielding agent.

3. A process for the manufacture of the complex copper compound of the substantive polyazo dyestuff of the following formula

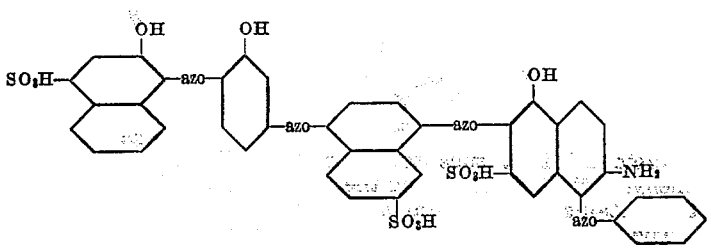

comprising the steps of diazoting the disazo dyestuff of the formula

[structure shown at line 55]

coupling the resultant diazodisazo dyestuff with the monoazo dyestuff of the formula

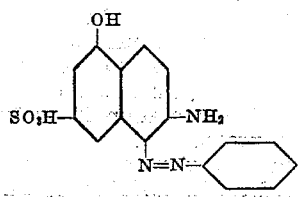

and interacting the resultant polyazo dyestuff with a copper yielding agent.

4. A process for the manufacture of the complex copper compound of the substantive polyazo dyestuff of the following formula

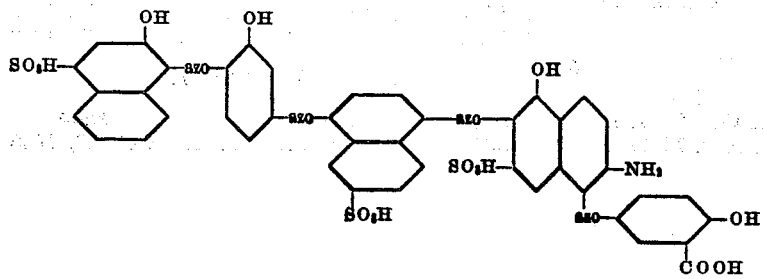

comprising the steps of diazotizing the disazo dyestuff of the formula

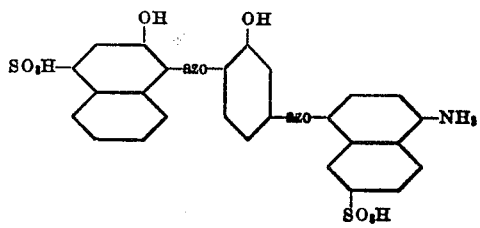

coupling the resultant diazodisazo dyestuff with the monoazo dyestuff of the formula

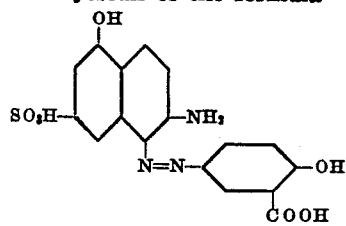

and interacting the resultant polyazo dyestuff with a copper yielding agent.

5. A complex metal compound of a substantive polyazo dyestuff of the formula

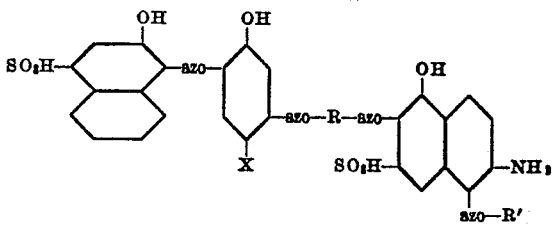

wherein X is a member selected from the group consisting of hydrogen and alkyl, R means the radical of Cleve's acid and R' is a member selected from the group consisting of substituted and unsubstituted phenyl radicals, which complex metal compound dyes cellulose fibres in fast blue-grey shades.

6. A complex copper compound of a substantive polyazo dyestuff of the formula

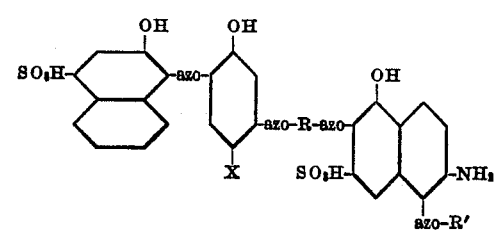

wherein X is a member selected from the group consisting of hydrogen and alkyl, R means the radical of Cleve's acid and R' is a member selected from the group consisting of substituted and unsubstituted phenyl radicals, which complex copper compound dyes cellulose fibres in fast blue-grey shades.

7. The complex copper compound of the substantive polyazo dyestuff of the formula

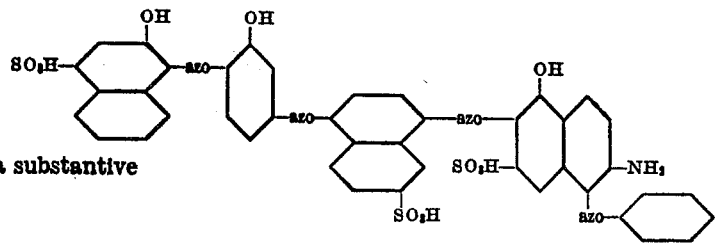

which complex copper compound dyes cellulose fibres in fast bluish-grey shades.

8. The complex copper compound of the substantive polyazo dyestuff of the formula

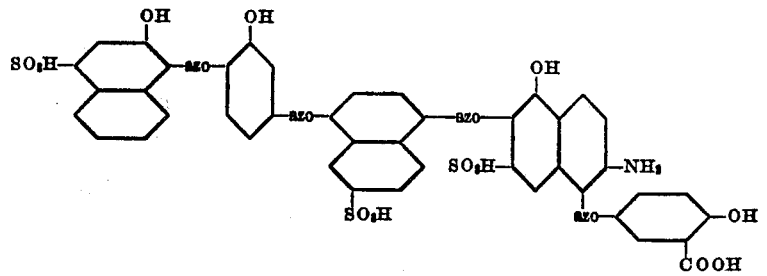

which complex copper compound dyes cellulose fibres in greenish grey-blue shades.

WALTER WEHRLI.

(References on following page)

REFERENCES CITED

The following references are of record in the file of this patent:

UNITED STATES PATENTS

| Number | Name | Date |
|---|---|---|
| 1,829,672 | Richard | Oct. 27, 1931 |
| 2,180,245 | Krebser | Nov. 14, 1939 |
| 2,203,196 | Hanhart | June 4, 1940 |
| 2,215,087 | Schweitzer | Sept. 17, 1940 |
| 2,270,675 | Stein et al. | Jan. 20, 1942 |

FOREIGN PATENTS

| Number | Country | Date |
|---|---|---|
| 836,059 | France | Oct. 10, 1938 |